July 14, 1953 C. OTTO 2,645,559
AMMONIUM SULFATE PRODUCTION
Filed March 23, 1949
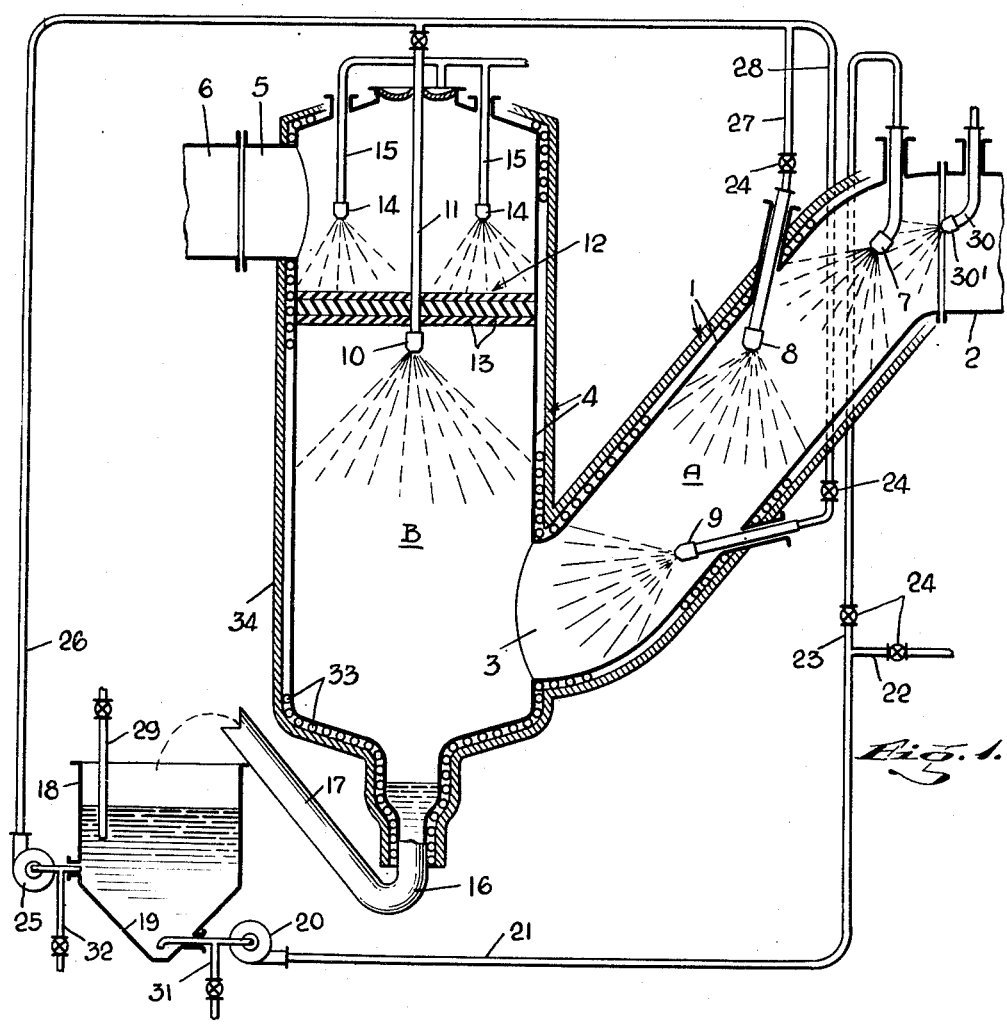
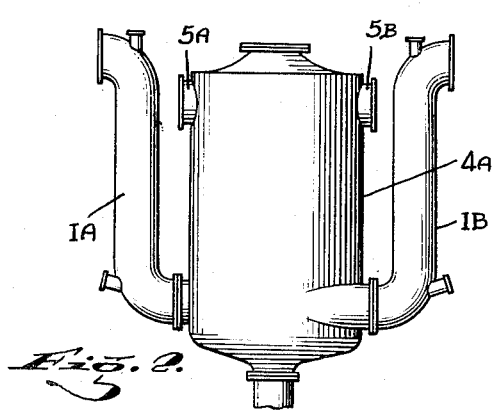
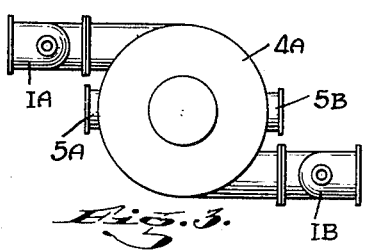
INVENTOR.
CARL OTTO
BY John E. Hubbell
ATTORNEY Patented July 14, 1953

2,645,559

UNITED STATES PATENT OFFICE 2,645,559

AMMONIUM SULFATE PRODUCTION

Carl Otto, Manhasset, N. Y.

Application March 23, 1949, Serial No. 82,959

7 Claims. (Cl. 23—119)

The general object of the present invention is to provide an improved method of, and improved apparatus for the production of sulphate of ammonia by spraying saturated ammonium sulphate liquor containing sulphuric acid into a stream of coke-oven gas or other gas having a similarly small free ammonia content.

In my prior application, Serial No. 14,902, filed March 5, 1948, now Patent No. 2,599,067, and in earlier applications of which said prior application is a continuation in part, I have disclosed and claimed a method of and apparatus for converting the ammonia content of coke-oven or analogous gas into sulphate of ammonia, characterized by the dispersion of saturated ammonia sulphate liquor with a sulphuric acid content into a stream of coke-oven gas moving upwardly through a spray chamber. In my prior application, Serial No. 47,562, filed September 3, 1948, now abandoned, I have disclosed and claimed an improvement on the invention of my application Serial No. 14,902, characterized by the dispersion of the finely divided liquor above mentioned in a stream of coke-oven gas moving downward through an elongated spray chamber of relatively small diameter. With the use of said improvement it is possible to convert all but a small fraction of the ammonia content of the gas into sulphate of ammonia with apparatus of less bulk, per ton of sulphate produced per hour, than is possible with previously known apparatus or methods.

A specific object of the present invention is to effect an advantageous combination of characteristic features of the conversion apparatus and methods disclosed in said prior applications, Serial Nos. 14,902 and 47,562.

A still more specific object of the present invention is to combine primary and secondary spray chambers or zones, each of which extends between upper and lower levels and has a lower portion connected to a lower portion of the other, so that the gas flow will be downward through the primary spray chamber and upward through the secondary spray chamber, and so that liquor sprayed into the primary spray chamber will drain into the secondary chamber from which the liquor sprayed into both chambers is withdrawn.

In accordance with the invention, the bulk of the ammonia content of the gas is converted into sulphate of ammonia in the primary spray chamber, which need have a cross-section no larger than that of the piping through which the gas is passed to, and away from, the conversion apparatus. In consequence the bulk of the apparatus in which all but a small portion of the ammonia in the gas is converted into ammonium sulphate, may be relatively very small. The secondary chamber is advantageously substantially larger in cross-section than the primary chamber, so that the up flow gas velocity in the primary secondary spray chamber is a relatively small fraction of the gas flow velocity in the primary chamber. In consequence, the relatively large amount of entrained liquor carried into the secondary chamber may be largely eliminated by liquor sprayed downwardly into the upper end of the secondary chamber, and the remainder of the entrained liquor may be readily separated from the gas by an acid-catcher horizontal foraminous baffle structure extending across the upper end of the secondary chamber and interposed between the latter and the gas outlet from the conversion apparatus.

The various features of novelty which characterize the invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred forms of the invention.

Of the drawings:

Fig. 1 is a somewhat diagrammatic sectional elevation of a preferred apparatus embodiment of the invention;

Fig. 2 is a diagrammatic small scale elevation of a modified form of apparatus; and Fig. 3 is a plan view of the apparatus shown in Fig. 2.

The apparatus shown by way of illustration and example in Fig. 1 comprises a primary spray chamber A, a secondary spray chamber B and an acid-catcher structure 12 above the chamber B. The primary spray chamber A is formed by the bore of an uprising pipe section 1, which has its upper end connected to a pipe section 2 through which coke-oven gas or other distillation gas is passed to the apparatus shown in Fig. 1. The lower end of the pipe 1 is connected through a gas inlet 3 in the lower portion of a vertical tank 4 which encloses the secondary spray chamber B, and also encloses an acid-catcher above the chamber B. In some cases, the pipe 1 may be vertical, as is the spray chamber shown in my above mentioned prior application, Ser. No. 47,562. Advantageously in some cases, however, and as shown, the pipe 1 is inclined to the vertical at an angle of about 40°, and has its lower and upper ends respectively adjacent and laterally displaced from the tank 4. The latter is formed adjacent its upper end with a gas outlet 5 connected to a pipe section 6 through which the gas moving through the saturator passes away from the latter.

As shown, ammonium sulphate liquor with a small sulphuric acid content is sprayed into the spray chamber A through a plurality of spray nozzles 7, 8 and 9 distributed along the length of the spray chamber, and is sprayed downwardly into the upper end of the chamber B through a spray nozzle 10. The latter, as shown, is carried at the lower end of a spray pipe 11 which extends into the tank 4 through its upper end wall and is shown as coaxial with the tank. The pipe 10 extends centrally through a baffle structure 12 interposed between the spray chamber B and the gas outlet 5. The baffle structure 12 serves as an acid-catcher, and is formed with a multiplicity of tortuous passages through which the gas must flow in passing from the chamber B to the outlet 5. Liquor particles entrained by the gas impinge against and adhere to the walls of said passages, and are thus separated from the gas passing away from the baffle structure 12 to the gas outlet 5.

As shown, the baffle structure 12 is formed of parallel, spaced apart, transversely bent metal plates 13. Structurally the baffle structure 12 may well be of any usual or suitable type employed as so-called hurdle washers in benzol and other scrubbing chambers. One known form of hurdle washer which may be employed is shown in the Beimann Patent No. 2,003,271 of May 3, 1935, and comprises transversely bent baffle plates in the form of strips of expanded metal. However, for the purpose of the present invention, the baffle plates 13 may well be formed by transversely bending imperforate sheet metal strips. The liquor adhering to the plates 13 forms liquor films thereon which flow downward under the action of gravity, and drip from the lower edges of the plates into the chamber B.

The volume of liquid in the films on the plates 13 is augmented by hot wash water sprayed on to the top of the baffle structure 12 by spray nozzles 14 secured to the lower ends of hot water supply pipes 15 extending through and depending from the upper end wall of the tank 4. The continuous discharge of wash water on to the baffle structure 12 by the nozzles 14, prevents the passages through said structure from being clogged by rock salt deposits. The tendency to the formation of rock salt deposits in the baffle structure is especially pronounced as a result of the supersaturation of the liquor entrained by the gas passing upward through the baffle structure. To avoid risk of corrosive attack by the liquor, with its sulphuric acid content, the pipe 1, tank 4, baffle plates 13, spray nozzles and pipes extending into the pipe 1 and tank 4 are formed of suitable acid-resistant material, which may well be Monel metal.

The liquor and wash water mixture sprayed into the chambers A and B, and eventually gravitating into the lower end of the tank 4, is continuously withdrawn from the latter through a central outlet pipe 16 depending from the lower end of the tank 4. An uprising extension 17 of the pipe 16 unites with the latter to form a liquid sealed overflow outlet from the tank 4, through which the liquor and entrained crystals are discharged into a crystallizer tank 18. Preferably the outlet pipe sections 16 and 17 are so proportioned and arranged that the liquid level in the pipe 16 will be at all times definitely below the lower end wall of the tank 4, as this minimizes difficulties due to rock salt deposits. The liquid level in the pipe section 16 is normally below the discharge end of the pipe section 17 in consequence of the fact that the gas pressures in the chambers A and B, and in the pipes 2 and 6 are somewhat above the pressure of the atmosphere.

As shown, the crystallizer tank 18 is open at its upper end and is formed with a hopper bottom 19. The supersaturated ammonium sulphate liquor passing through the pipe 17 is desupersaturated in the tank 18, as a result of the deposits of ammonium sulphate in solid form on the growing crystals in the tank, and as a result of the formation of new crystal nuclei or seed crystals. As the crystals increase in size, their tendency to collect in the lower end of the hopper bottom portion of the tank 18 increases. A pump 20 having its inlet pipe extending into the lower end of the hopper bottom portion of the tank 18 withdraws liquor and crystals from the tank 18 and discharges the liquor and crystals through the pump outlet pipe 21. The latter discharges liquor and entrained crystals through branches 22 and 23 in relative amounts determined by the relative adjustments of the regulating valves 24 in said branch pipes. The branch pipe 22 is adapted to deliver liquor and entrained crystals to a crystal separator and the latter delivers the crystals separated from the liquor to a centrifugal drier from which the crystals are passed to storage. The liquor from which the crystals are separated is ordinarily returned to the tank 18. Inasmuch as the crystal separator and associated crystal drier and liquor return provisions may be of well known forms, and are not claimed herein, they need not be illustrated or further described.

The liquor and entrained crystals passing from the pipe 21 into the branch pipe 23, are delivered by the latter to the nozzle for dispersion in the chamber A. Saturated liquor and entrained crystals are also withdrawn from the tank 18 through the inlet pipe of a pump 25. That inlet pipe advantageously, and as shown, opens to the tank 18 at a level well above the level at which the inlet pipe of the pump 20 opens to the tank. In consequence, the average size of the crystals withdrawn by the pump 25 is smaller than the average size of the crystals withdrawn by the pump 20. The pump 25 discharges saturated ammonium sulphate liquor, with its acid and entrained crystal content, through the pipe 11 and nozzle 10 into the chamber B, and through branch pipes 27 and 28 and associated nozzles 8 and 9 into the chamber A for dispersion in said chambers. The amount of liquor supplied to each of the pipes 11, 27 and 28 is regulated by the adjustment of an individual regulating valve 24.

Makeup acid is supplied through a pipe 29 shown as having its discharge end extending downward into the body of liquor in the tank 18. Objectionable rock salt deposits in the saturator chamber A and in the pumps 20 and 25 and associated pipes, are avoided by the use of valved hot water supply connections 30, 31 and 32. The pipe connection 30 supplies water to a spray nozzle 30' which sprays the water into the upper end of pipe 1. The hot water supply connections 31 and 32 are adapted to pass hot wash water into the inlet pipes of the pumps 20 and 25, respectively.

Advantageously, and as shown, the walls of the spray chambers A and B and of the liquor outlet pipe sections 16 and 17 are heated to prevent objectionable rock salt deposits on the inner surface of those walls. The wall heating means employed may take various forms. For example, electrical heating means, or conventional steam jackets may be used as the wall heaters. Advantageously and as shown, however, the heating means comprise copper pipes 33 coiled about the pipe 1 and tank 4, and about the outlet pipe sections 16 and 17. The pipes 33 are covered by a layer 34 of heat insulation material. Heat may be supplied to the copper pipes 33 by connecting the latter into a hot water circulating system, or by passing steam into, and withdrawing water of condensation from the pipes, as conditions make desirable. Inasmuch as the means for supplying the heating fluid to the pipes 33 may be of conventional form, and are not claimed as novel herein, they need not be illustrated or further referred to herein.

In the normal operation of the apparatus shown in Fig. 1, gas flows through the pipe 2 into the pipe 1 and thence through the tank 4 and into the pipe 16 at a rate dependent upon the capacity and operating conditions of the coke-ovens supplying the gas. The apparatus shown in Fig. 1 was designed and is adapted to efficiently convert into ammonium sulphate the ammonia content of gas passing through the apparatus at the rate of ninety million cubic feet per twenty-four hour day and resulting in the production of about 90 tons of ammonium sulphate per day. In the particular apparatus design illustrated, by way of example in Fig. 1, the pipe sections 1, 2 and 6 each have a diameter of 4½ ft. The pipe section 1 is about 16 ft. long. The tank B is 8 ft. in diameter, and the vertical extent of the tower 4 between the level of the under side of the outlet 5 and the upper side of the inlet 3 is nine feet, and the other dimensions of the tank 4 are to the same scale. In the contemplated normal operation of the apparatus illustrated in Fig. 1, the liquor is discharged by the different nozzles 7, 8, 9 and 10 at the respective rates of 330, 170, 170 and 330 gallons per minute.

The spray nozzle 7 is adapted to discharge a relatively coarse spray comprising liquor particles or droplets having an average diameter of about two millimeters and the particles discharged by the nozzle 7 are dispersed throughout and substantially fill an appreciable portion of the length of the pipe 1 between the nozzles 7 and 8. Operating as described, the saturated ammonium sulphate liquor and sulphuric acid mixture discharged by the single spray nozzle 7 will convert into ammonium sulphate about 90% of the ammonia content of the gas entering the pipe 1. The very rapid rate at which the ammonia is removed from the gas by the saturated ammonium sulphate liquor spray discharged by the nozzle 7 does not result in an undesirable formation of seed crystals. This is due, in large part at least, as I understand and believe, to the rapid deposit of ammonium sulphate in solid form on crystals passed to the nozzle 7 from the lower end of the tank 18 by the pump 20 to the nozzle 7 and dispersed by the latter in the spray chamber. The crystals so dispersed by the nozzle 7 are substantial in volume and many of them are of considerable size.

The nozzle 8 may advantageously be of a character to discharge a relatively fine spray comprising liquor particles of an average diameter of 1½ millimeters or less. The nozzles 9 and 10 are advantageously adapted to discharge a relatively coarse spray, similar to the spray discharged by the nozzle 7. While the fine spray discharged by the nozzle 8 is a highly efficient absorber of ammonia, it tends to produce a troublesome liquor entrainment. Relatively fine liquor particles entrained in the portion of the gas stream into which a coarse spray is discharged, are eliminated, to a considerable extent, by the coarse spray, since the coarse particles coalesce with the small spray particles against which the coarser particles impinge.

The reduction in liquor entrainment of the up-flowing gas thus effected by the coarse spray discharged by the nozzle 10, is increased by the reduction in the velocity of the upflowing gas in the chamber B as compared with the velocity of the downflowing gas in the pipe 1. With apparatus having the dimensions stated and operating at full capacity, the gas velocity in the chamber A is about 65 feet per second, and the gas velocity in the tank 4 is about 16 feet per second.

In operating at full capacity, the ammonium sulphate produced is of good quality, and with the sulphate particles of such satisfactory size that less than 20% will pass through a 70-mesh screen.

The spray nozzles 6, 7, 8, 9 and 10 may be of any one of various commercially available types operative to provide the desired fineness of subdivision of the liquor discharged, and free from objectionable tendency to be clogged by the entrained crystals in the liquor passed to the nozzles by the pumps 20 and 25. In practice I have successfully used spray nozzles of a commercially available type which is disclosed in Eneas Patent No. 1,101,264, granted June 23, 1914. As is well known, the average size of the liquor particles discharged by such nozzles depend both on the nozzle dimensions and on the pressure at which the liquor is supplied to the nozzles.

Entrained liquor in the gas passing upward from the level of the nozzle 10 to the gas outlet 5, is substantially entirely removed from the gas by the acid catcher baffle structure 12. Clogging up the baffle structure deposits by solid ammonium sulphate deposits may be effectually prevented by hot water sprayed onto the top of the baffle structure by the nozzles 14 in an amount insufficient to interfere with the efficient production of ammonium sulphate crystals of desirable size and quality. I have found that when the liquor spray first encountering the gas and effecting the major portion of the ammonia absorption is a relatively coarse spray, the average size of the crystals recovered is larger than when that spray is relatively fine.

The liquor passing into the crystallizer tank 18, through the outlet pipe sections 16 and 17 from the lower end of the tank 4 is supersaturated, but is rapidly desupersaturated in said tank as a result of the deposit of ammonium sulphate on the growing crystals in contact with the supersaturated liquor, and the formation of crystal nuclei or seed crystals. The formation of solid ammonium sulphate deposits on the internal walls of the pipe 1 and tank 4 and pipe sections 16 and 17 is prevented by heating the walls to a temperature slightly higher than the temperature of the gas and liquor particles coming into contact with those walls.

In some cases it may be desirable to combine two primary scrubbing chambers with a single secondary scrubbing chamber. One such arrangement is shown diagrammatically by way of example in Figs. 2 and 3. In those figures 4A designates a tank like the tank 4 of Fig. 1, except that it has two gas outlets 5A and 5B. The tank 4A encloses a secondary chamber, and an acid-catcher may be exactly like the chamber B and acid-catcher 12 shown in Fig. 1. Each of the pipes IA and IB shown in Figs. 2 and 3 encloses a primary scrubbing chamber which may be like the scrubbing chamber A of Fig. 1, in respect to the arrangement of spray nozzles within the pipe. As shown in Fig. 1, the pipes IA and IB are each vertical so that their upper ends, as well as their lower ends, are closely adjacent to the tank 4A. As shown in Figs. 2 and 3, the lower end of each of the pipes IA and IB discharges gas tangentially into the tank 4A. In consequence, the entering gas is given a whirling motion in the lower portion of the tank 4A which contributes to a rapid reduction in the initial amount of liquor entrained by the gas.

When the saturator unit shown in Figs. 2 and 3 has the same capacity as the unit shown in Fig. 1, the cross-sectional area of each of the pipes IA and IB need be only half as great as the cross-sectional area of the pipes IA and IB and the corresponding reduction in the cross-sectional area of the gas outlets 5A and 5B has the practical advantage of reducing the size of the valves not shown, but necessarily included in the pipe connection to each of the pipes IA and IB and to each of the gas outlets 5A and 5B.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of the invention may be used to advantage without a corresponding use of other features.

Having now described my invention, what I claim as new and desire to secure by Letters Patent, is:

1. The method of producing ammonium sulphate from gas having a small ammonia content, which consists in passing the gas downward through a primary spray zone and then upward through a secondary spray zone having a lower portion in communication with the lower end of the primary spray zone, each of said zones being substantially unobstructed, dispersing saturated ammonium sulphate liquor having a small sulphuric acid content in the upper portion of each zone and thereby supersaturating said liquor, and removing the liquor sprayed into said zones from the lower end of said secondary zone.

2. A method as specified in claim 1, in which the liquor dispersed in the upper portion of each zone entrains ammonium sulphate crystals.

3. A method specified in claim 1, in which entrained liquor in the gas passing upward away from said secondary zone is caused to impinge against and adhere to acid-catching surfaces.

4. A method as specified in claim 1, in which the super-saturated liquor withdrawn from the lower end of the secondary zone is passed into a crystallizer receptacle in which the liquor is de-supersaturated and from which liquor and entrained crystals are withdrawn for the separation of some of the crystals from the liquor and for the dispersion of other crystals and liquor in said spray zones.

5. The method specified in claim 1, in which liquor and crystals are introduced into said primary spray zone for dispersion therein at different levels.

6. A method specified in claim 1, in which the gas is passed upward away from said secondary zone into an acid separator zone superimposed on said secondary zone and including a horizontal foraminous baffle extending across the cross sectional area of the acid separator.

7. A method as specified in claim 6, in which hot water is sprayed onto the upper side of said baffle to remove acid, ammonium sulphate solution and crystal deposits from said baffle.

CARL OTTO.

References Cited in the file of this patent

UNITED STATES PATENTS

| Number | Name | Date |
|---|---|---|
| 1,562,914 | Poindexter | Nov. 24, 1925 |
| 1,922,186 | Wirgert | Aug. 15, 1933 |
| 1,942,050 | Davies | Jan. 2, 1934 |
| 1,971,563 | Hirschkind et al. | Aug. 28, 1934 |
| 2,067,311 | Baehr | Jan. 12, 1937 |
| 2,435,898 | Otto | Feb. 10, 1948 |
| 2,482,643 | Tiddy | Sept. 20, 1949 |